3,388,158
1-(DICHLOROBENZYL)-3-METHYL
(OR 3,3-DIMETHYL)UREAS
Alexander R. Surrey, Albany, N.Y., assignor to Sterling Drug Inc., New York, N.Y., a corporation of Delaware
No Drawing. Filed Aug. 9, 1965, Ser. No. 478,436
5 Claims. (Cl. 260—553)

ABSTRACT OF THE DISCLOSURE 1-(dichlorobenzyl)-3-methyl (or 3,3-dimethyl)ureas, herbicidal agents, are prepared by reacting a dihalobenzyl isocyanate with methylamine or dimethylamine.

---

This invention relates to compositions of matter known as substituted-ureas and to a method for their use.

The invention sought to be patented, in its composition aspect, resides in the class of compounds which I designate as having a molecular structure in which urea is substituted at the 3-position by one or two methyl groups, at the 1-position by benzyl bearing two halo ring substituents, at least one at the 4-position. This composition aspect is represented by the Formula I

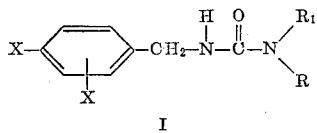

I where X is halogen, R is hydrogen or methyl, and $R_1$ is methyl.

The invention sought to be patented, in its method aspect, resides in the method of controlling undesirable plant growth which comprises applying to an area to be protected from such growth a herbicidally effective amount of a compound of Formula I.

As used herein, the term "halo" or "halogen" means chloro, bromo, iodo or fluoro.

The compounds of Formula I are prepared by reacting a dihalobenzyl isocyanate with methylamine or dimethylamine preferably in the presence of an inert solvent such as benzene. This procedure is illustrated diagrammatically as follows:

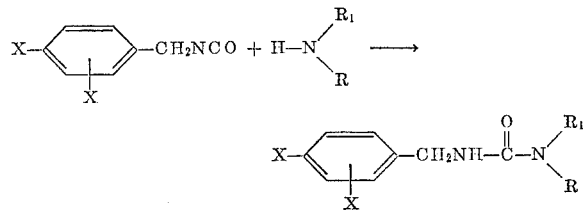

where X, R and $R_1$ have the meanings given above.

The compounds of Formula I where R is hydrogen are prepared by reacting the appropriate benzylamine with methyl isocyanate, illustrated structurally as follows:

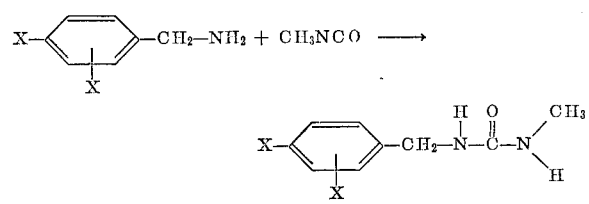

where X has the meaning given for Formula I.

Alternatively, the compounds of Formula I are obtained by treating the corresponding thioureas with alkaline peroxide, metallic oxides or aqueous chloroacetic acid, illustrated with sodium peroxide as follows:

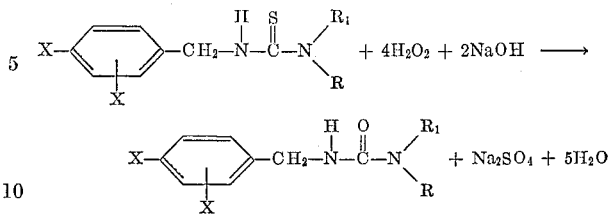

where X, R and $R_1$ have the meanings given for Formula I.

The reactants used in the above procedures are generally known, as are the procedures, and are either commercially available or readily prepared by known processes.

The chemical structures of my compounds of Formula I are established by the mode of their synthesis and corroborated by the correspondence of calculated and found values for the elementary analyses for representative examples.

The following examples will further illustrate specific embodiments of the invention without, however, limiting it thereto.

Example 1

1-(3,4-dichlorobenzyl) - 3 - methylurea.—Benzene (100 ml.) cooled to 0–5° C. was saturated with monomethylamine. To this benzene solution kept at 0–5° C. was added over a period of fifteen minutes with stirring 8.0 g. of 3,4-dichlorobenzyl isocyanate in 50 ml. of benzene. The reaction mixture was stirred at room temperature for two hours, refluxed for fifteen minutes and cooled. The product that separated was collected, washed with n-pentane, air-dried, recrystallized from a mixture of 150 ml. of toluene and 50 ml. of xylene and dried overnight at 40° C. in vacuo to yield 5.1 g. of 1-(3,4-dichlorobenzyl)-3-methylurea, M.P. 161.6–162.6° C. (corr.).

*Analysis.*—Calcd. for $C_9H_{10}Cl_2N_2O$: Cl, 30.42; N, 12.02. Found: Cl, 30.59; N, 12.06.

The above intermediate 3,4-dichlorobenzyl isocyanate was prepared as follows: Toluene (600 ml.) was heated on a steam bath and saturated over a period of thirty minutes with phosgene. To this solution was added portionwise over a period of four hours a solution containing 100 g. of 3,4-dichlorobenzylamine in 1000 ml. of toluene while passing a slow stream of phosgene into the reaction mixture. The reaction mixture was heated on the steam bath one more hour while adding a slow stream of phosgene, and allowed to cool. About 400 ml. of the toluene was distilled off and the concentrated solution was cooled, filtered and evaporated in vacuo to remove the rest of the toluene. The remaining residue was distilled under reduced pressure to yield 74.5 g. of 3,4-dichlorobenzyl isocyanate, B.P. 114–116° C. at 2–3 mm.

Example 2

1-(3,4-dichlorobenzyl)-3,3-dimethylurea was prepared following the procedure described in Example 1 by adding over a fifteen minute period to 100 ml. of a cooled solution of dry benzene saturated with dimethylamine a solution of 7 g. of 3,4-dichlorobenzyl isocyanate in 50 ml. of benzene. The reaction mixture was stirred at 0–5° C. for two hours, at room temperature for one hour, allowed to stand at room temperature overnight, then refluxed for one hour and evaporated in vacuo to remove the benzene. The remaining crystalline residue was recrystallized from n-hexane, washed with n-pentane and dried in vacuo at 40° C. overnight to yield 7.0 g. of 1-(3,4-dichlorobenzyl)-3,3-dimethylurea, M.P. 87.2–88.4° C. (corr.).

*Analysis.*—Calcd. for $C_{10}H_{12}Cl_2N_2O$: C, 48.60; H, 4.90; N, 11.39. Found: C, 48.71; H, 5.12; N, 11.36.

Example 3

1-(2,4-dichlorobenzyl)-3-methylurea was prepared following the procedure described in Example 1 by adding over a ten minute period a solution containing 7 g. of 2,4-dichlorobenzyl isocyanate in 50 ml. of dry benzene to a cooled solution of 100 ml. of dry benzene saturated with monomethylamine. The mixture was stirred at 0–5° C. for thirty minutes, at room temperature for two hours and then refluxed for thirty minutes. It was next cooled and the separated product was collected, washed with n-pentane, recrystallized from 200 ml. of dioxane and dried in vacuo at 40° C. for five hours to yield 7.1 g. of 1-(2,4-dichlorobenzyl) - 3 - methylurea, M.P. 176.0–177.0° C. (corr.).

*Analysis.*—Calcd. for $C_9H_{10}Cl_2N_2O$: C, 46.37; H, 4.32; N, 12.02. Found: C, 46.12; H, 4.44; N, 12.02.

The above intermediate 2,4-dichlorobenzyl isocyanate was prepared following the procedure described in Example 1 to prepare the corresponding 3,4-dichlorobenzyl isocyanate using 100 g. of 2,4-dichlorobenzylamine, phosgene, and toluene as the solvent. There was thus obtained 75.1 g. of 2,4-dichlorobenzyl isocyanate, B.P. 92–96° C. at 1–1.5 mm.

Example 4

1-(2,4-dichlorobenzyl)-3,3-dimethylurea was prepared following the procedure described in Example 1 by adding a solution containing 7 g. of 2,4-dichlorobenzyl isocyanate in 50 ml. of dry benzene to a stirred, cooled (0–5° C.) solution of 100 ml. of dry benzene saturated with dimethylamine, stirring the reaction mixture while cold for thirty minutes and then at room temperature for two hours, followed by refluxing it for thirty minutes and distilling off the benzene in vacuo. The remaining crystalline material was recrystallized once from benzene-n-hexane using decolorizing charcoal and once from benzene-n-heptane and dried in vacuo at 40° C. overnight to yield 6.4 g. of 1-(2,4-dichlorobenzyl)-3,3-dimethylurea, M.P. 94.2–95.6° C.

*Analysis.*—Calcd. for $C_{10}H_{12}Cl_2N_2O$: C, 48.60; H, 4.90; N, 11.39. Found: C, 48.49; H, 5.17; N, 11.56.

Example 5

1-(3,4-dibromobenzyl)-3-methylurea is obtained by following the procedure described in Example 1 using corresponding molar equivalent quantities of 3,4-dibromobenzyl isocyanate and monomethylamine. The intermediate 3,4-dibromobenzyl isocyanate is prepared by following the procedure described in Example 1 for the preparation of 3,4-dichlorobenzyl isocyanate using a corresponding molar equivalent quantity of 3,4-dibromobenzylamine in place of 3,4-dichlorobenzylamine.

Example 6

1-(3,4-diiodobenzyl)-3-methylurea is obtained by following the procedure described in Example 1 using corresponding molar equivalent quantities of 3,4-diiodobenzyl isocyanate and monomethylamine. The intermediate 3,4-diiodobenzyl isocyanate is prepared by following the procedure described in Example 1 for the preparation of 3,4-dichlorobenzyl isocyanate using a corresponding molar equivalent quantity of 3,4-diiodobenzylamine in place of 3,4-dichlorobenzylamine.

Example 7

1-(3,4-difluorobenzyl)-3,3-dimethylurea is obtained by following the procedure described in Example 1 using corresponding molar equivalent quantities of 3,4-difluorobenzyl isocyanate and dimethylamine. The intermediate 3,4-difluorobenzyl isocyanate is prepared by following the procedure described in Example 1 for the preparation of 3,4-dichlorobenzyl isocyanate using a corresponding molar equivalent quantity of 3,4-difluorobenzylamine in place of 3,4-dichlorobenzylamine.

Example 8

1-(2,4-dibromobenzyl)-3,3-dimethylurea is obtained by following the procedure described in Example 1 using corresponding molar equivalent quantities of 2,4-dibromobenzyl isocyanate and dimethylamine. The intermediate 2,4-dibromobenzyl isocyanate is prepared by following the procedure described in Example 1 for the preparation of 3,4-dichlorobenzyl isocyanate using a corresponding molar equivalent quantity of 2,4-dibromobenzylamine in place of 3,4-dichlorobenzylamine.

The herbicidal activity of my compounds is illustrated by the following results obtained from both pre-emergent and post-emergent applications.

The results presented in Table A were obtained using an aqueous ethanol solution of 1-(3,4-dichlorobenzyl)-3,3-dimethylurea (Example 2) and an aqueous ethanol-acetone solution of 1-(2,4-dichlorobenzyl)-3,3-dimethylurea (Example 4), and applying the solutions to greenhouse flats containing the freshly planted seeds of various species (for pre-emergence) or to greenhouse flats containing two to three week old plants (for post-emergence; two week old plants in the summer and three week old plants in the winter). Samples of 200 mg. of compound per 10 cc. of solvent were used for pre-emergence, the quantity of compound being equivalent to 16 lbs. per acre. The post-emergent application was equivalent to 8 lbs. of compound per acre. Samples of the compounds were applied to alfalfa, corn, snapbeans and soybeans, and the listed weeds; and main observations and injury ratings were made 2½ to 3 weeks after pre-application and 7 to 10 days after post-application.

Further observation was made as dictated by effects from treatment. The injury rating scale used was from 0 to 10, with 0 representing no injury; 10 representing 100% injury (all plants killed); and, 1 to 9 representing from 10 to 90% injury.

TABLE A

| Plant specie | Example 2 | | Example 4 | |
|---|---|---|---|---|
| | Pre 16 lbs./acre | Post 8 lbs./acre | Pre 16 lbs./acre | Post 8 lbs./acre |
| Alfalfa | 10 | 4 | 10 | 8 |
| Corn | 7 | 1 | 7 | 3 |
| Snapbeans | 9+ | 4 | 9 | 7 |
| Soybeans | 9 | 7 | 9 | 8 |
| Wild Oats | 8 | 2 | 9 | 2 |
| Cheat Grass | 10 | 1 | 9 | 2 |
| Foxtail | 10 | 2 | 9 | 2 |
| Barnyard | 10 | 3 | 8 | 2 |
| Crabgrass | 10 | 4 | 10 | 4 |
| Johnson Grass | 7 | 3 | 6 | 2 |
| Yellow Rocket | 10 | 2 | 10 | 10 |
| Chickweed | 10 | 3 | 10 | 8 |
| Pigweed | 10 | 1 | 10 | |
| Velvet Leaf | 10 | 1 | 10 | 5 |
| Lambsquarter | 10 | 8 | 10 | 10 |
| Curled Dock | 8 | 6 | 10 | 10 |

The above data in Table A obtained from the pre-emergent applications show the effectiveness of the compounds as herbicides against most of the plants tested, thereby indicating their usefulness in soil sterilization formulations. The above data from the post-emergent applications, at the dose level used, show the selective control of lambsquarter in plantings of corn with the compound of Example 2 and the selective control of yellow rocket, lambsquarter and curled dock in plantings of corn with the compound of Example 4.

The results for 1-(3,4-dichlorobenzyl)-3-methylurea (Example 1) and 1-(2,4-dichlorobenzyl)-3-methylurea (Example 3) in Table B were obtained as above but using only a 16 lbs./acre pre-emergent application as aqueous ethanol solutions.

TABLE B

| Plant specie | Example 1—Pre 16 lbs./acre | Example 3—Pre 16 lbs./acre |
|---|---|---|
| Alfalfa | 10 | 9 |
| Corn | 2 | 8 |
| Snapbeans | 4 | 4 |
| Soybeans | 10 | 8 |
| Wild Oats | 1 | 4 |
| Cheat Grass | 0 | 3 |
| Foxtail | 9 | 6 |
| Barnyard | 9 | 3 |
| Crabgrass | 9 | 9 |
| Johnson Grass | 10 | 2 |
| Yellow Rocket | 10 | 9 |
| Chickweed | 10 | 9 |
| Pigweed | 10 | 1 |
| Velvet Leaf | 9 | 7 |
| Lambsquarter | 10 | 10 |
| Curled Dock | 7 | 10 |

The above data of Table B show the selective control of certain weeds, e.g., foxtail, barnyard, crabgrass, Johnson grass, yellow rocket, chickweed, pigweed, velvet leaf and lambsquarter, in plantings of corn using pre-emergent application of the compound of Example 1. Also, the data of Table B show the effectiveness of the compounds of Examples 1 and 3 as herbicides against many of the plants tested, thereby indicating their usefulness in soil sterilization formulations.

The compounds of my invention are prepared for herbicidal application by admixing a compound of the invention, e.g., 1-(3,4-dichlorobenzyl)-3,3-dimethylurea, with herbicidal adjuvant as carrier to provide compositions in liquid or solid form. Liquid compositions are prepared by admixing an active compound with conventional liquid diluent media; since the compounds are relatively insoluble in water, they are conveniently prepared in common organic solvents, e.g., acetone, ethanol, etc., or in mixtures thereof, with or without water. Solid compositions are prepared in the form of dusts or granules by admixing the active compound with finely divided solid carriers, e.g., talc, clay, silica, fuller's earth and pyrophyllite. Whether in the form of liquids or solids, the compositions may also include conventional surface active dispersing agents, e.g., sodium dodecylbenzenesulfonate, dibutylammonium dodecylbenzenesulfonate, polyoxyethylene sorbitan monooleate, etc.

The compounds of my invention thus can be applied as both pre- and post-emergent herbicides according to well established practices in the art wherein herbicidally effective amounts of the herbicides are admixed with a herbicidally inert carrier.

The active ingredients of the compositions are applied in an amount sufficient to exert the desired herbicidal action. This amount will vary with the time of treatment, the type of soil, the stage of growth of both desirable plants which will simultaneously receive treatment and undesired plants or weeds. Where it is desired to control selectively the growth of plants in an area of mixed vegetation, the amount is carefully determined so as to obtain the desired result which must be determined by experiment on the particular combination of plant life present. Where complete sterilization of the soil is desired, sufficient material is used to kill the most resistant plants. For selective control, the rate of application will be from about 1 to 30 pounds per acre of the active compound of this invention, the preferred range being from about 4 to 20 pounds per acre. For complete sterilization where highly resistant plants are absent, applications as low as about 16 to 20 pounds per acre may be used, and the rate may be extended to about 50 to 60 pounds per acre in the case of highly resistant plants. Thus, as used herein, the term "herbicidally effective amount" of the active compound ranges from about 1 to 60 pounds per acre.

The compounds of my invention can be admixed advantageously with other active ingredients, e.g., fungicides, insecticides, fertilizers and plant hormones, to produce multi-purpose formulations.

I claim:
1. A compound of the formula

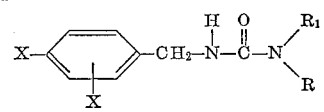

where X is halogen, R is hydrogen or methyl, and $R_1$ is methyl.
2. 1-(3,4-dichlorobenzyl)-3-methylurea.
3. 1-(3,4-dichlorobenzyl)-3,3-dimethylurea.
4. 1-(2,4-dichlorobenzyl)-3-methylurea.
5. 1-(2,4-dichlorobenzyl)3,3-dimethylurea.

References Cited

UNITED STATES PATENTS

| 2,723,192 | 11/1955 | Todd | 71—2.6 |
| 2,967,101 | 1/1961 | Hamm et al. | 71—2.6 |
| 3,164,632 | 1/1965 | Berger | 260—553 |

JAMES O. THOMAS, JR., *Primary Examiner.*